United States Patent [19]
Nomura

[11] Patent Number: 5,919,245
[45] Date of Patent: *Jul. 6, 1999

[54] MAP DATABASE APPARATUS

[75] Inventor: Takashi Nomura, Chigasaki, Japan

[73] Assignee: Xanavi Informatics Corporation, Kanagawa, Japan

[*] Notice: This patent is subject to a terminal disclaimer.

[21] Appl. No.: 08/734,071

[22] Filed: Oct. 21, 1996

Related U.S. Application Data

[63] Continuation-in-part of application No. 08/634,853, Apr. 19, 1996.

[30]    Foreign Application Priority Data

Apr. 21, 1995 [JP] Japan ........................................ 7-97320

[51] Int. Cl.$^6$ .................................................. G06F 165/00
[52] U.S. Cl. ........................ 701/207; 701/208; 701/209; 701/212; 340/990
[58] Field of Search ..................................... 701/200, 201, 701/202, 206, 207, 208, 209, 210, 211, 212; 340/988, 990, 995

[56]          References Cited

U.S. PATENT DOCUMENTS

| | | | |
|---|---|---|---|
| 5,031,093 | 7/1991 | Hasegawa | 370/238 |
| 5,036,471 | 7/1991 | Tamura et al. | 701/209 |
| 5,161,886 | 11/1992 | De Jong et al. | 701/209 |
| 5,204,817 | 4/1993 | Yoshida | 701/209 |
| 5,410,485 | 4/1995 | Ichikawa | 701/209 |
| 5,513,110 | 4/1996 | Fujita et al. | 701/207 |
| 5,523,765 | 6/1996 | Ichikawa | 701/213 |

FOREIGN PATENT DOCUMENTS

| | | |
|---|---|---|
| 0 393 632 | 10/1990 | European Pat. Off. . |
| 1-263688 | 10/1989 | Japan . |
| 2-90191 | 3/1990 | Japan . |
| 2-267583 | 11/1990 | Japan . |
| 3-26917 | 2/1991 | Japan . |
| 3-225391 | 10/1991 | Japan . |
| 2 276 722 | 10/1994 | United Kingdom . |

OTHER PUBLICATIONS

Proceedings of the Vehicle Navigation and Information Systems Conference (VNIS), No. CONF. 1, Sep. 1989, pp. 319–323, S. Kamijo et al. "Digital Raod Map Data Base for Vehicle Navigation and Road Information Systems".

*Primary Examiner*—Jacques R. Louis-Jacques
*Assistant Examiner*—Gertrude Arthur
*Attorney, Agent, or Firm*—Evenson, McKeown, Edwards & Lenahan, P.L.L.C.

[57]           ABSTRACT

The present invention is applied to a map database apparatus, where: a road is represented as a link string in which a plurality of links, each of which has nodes at both ends thereof, are connected; and a plurality of link string data, each of which includes node information relating to the node and is respectively provided for each of levels which correspond to different scale maps with regard to an identical link string, are stored. And a link of a lower level which has a larger scale, the link being common to a link of a upper level which has a smaller scale, has a link identifying data which is common to a link identifying data of the common link of the upper level.

6 Claims, 27 Drawing Sheets

FIG. 8A

| |
|---|
| ⋮ |
| MESH CODE |
| NUMBER OF LINK CLASSIFICATIONS |
| POSITION INFORMATION WORD SIZE |
| FERRY INFORMATION WORD SIZE |
| POSITION INFORMATION |
| FERRY INFORMATION |
| ROUTE BLOCK ATTTRIBUTES |
| START POINT/ END POINT LINK INFORMATION |
| ⋮ |
| MESH CODE |
| ⋮ |

FIG. 8B

| |
|---|
| ⋮ |
| LINK CLASSIFICATION |
| NUMBER OF LINKS |
| LINK NO. |
| ⋮ |
| LINK CLASSIFICATION |
| ⋮ |

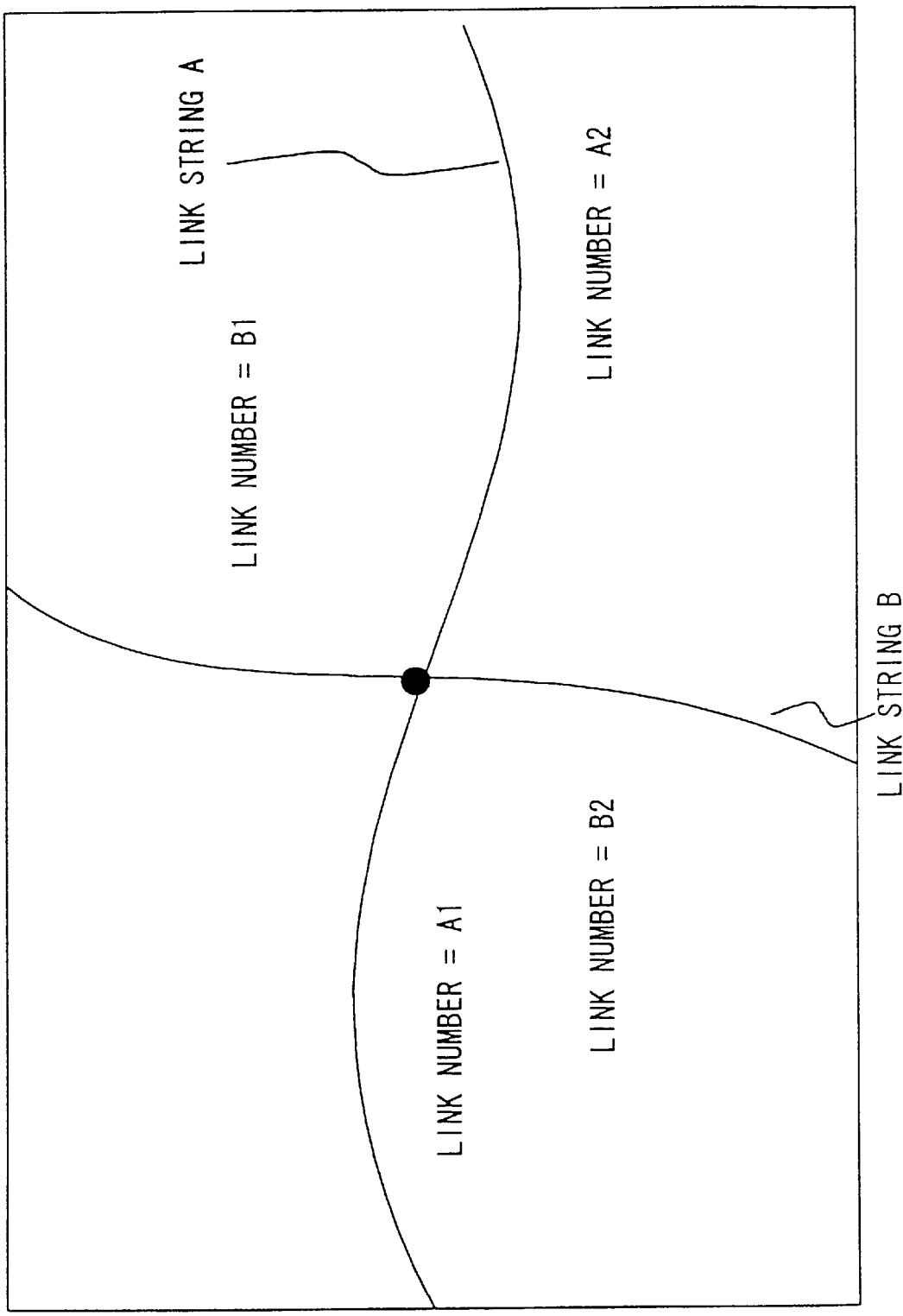

FIG. 12

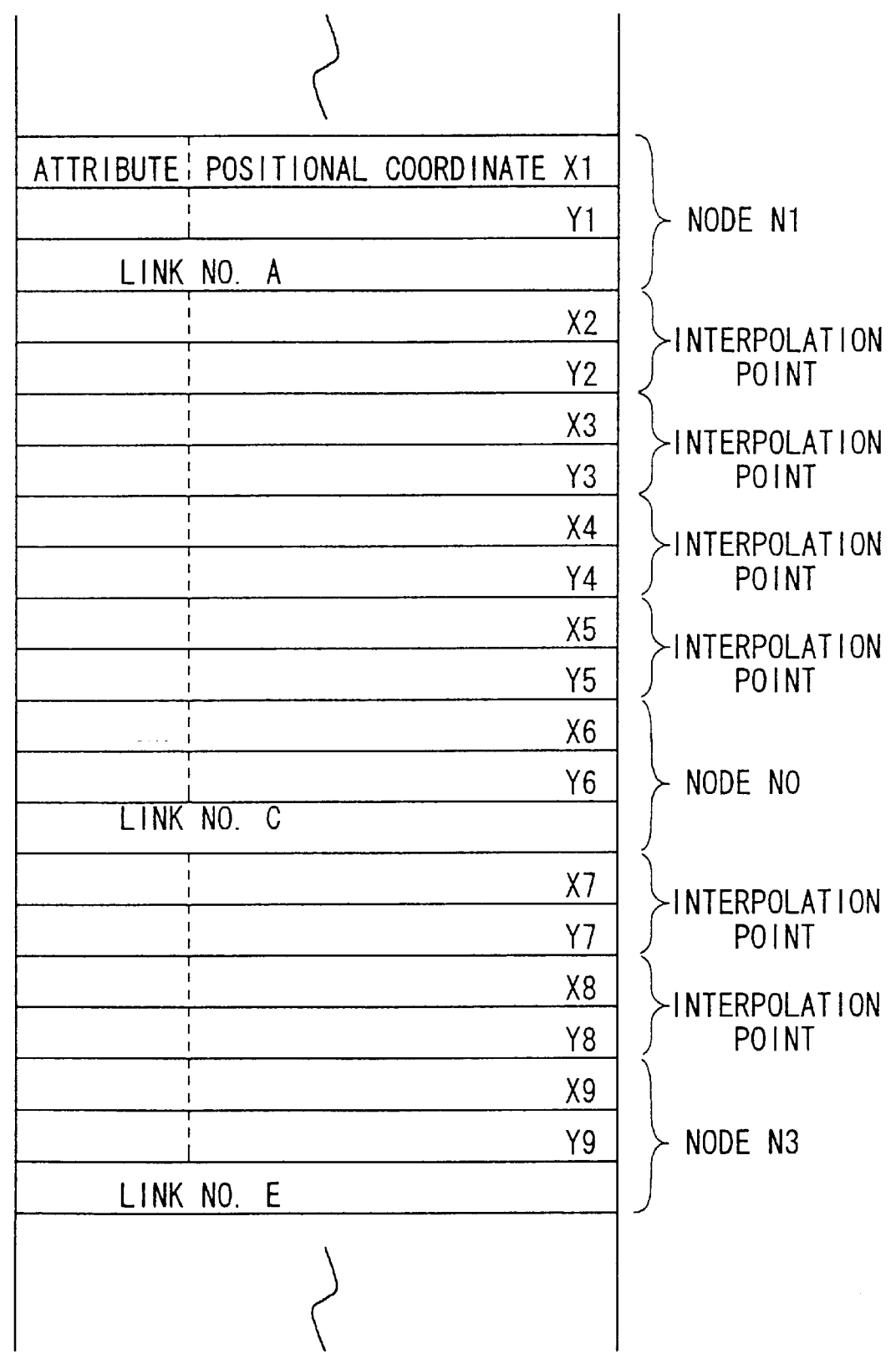

| ATTRIBUTE | POSITIONAL COORDINATE | |
|---|---|---|
| | X1 | } NODE N1 |
| | Y1 | |
| LINK NO. A | | |
| | X2 | } INTERPOLATION POINT |
| | Y2 | |
| | X3 | } INTERPOLATION POINT |
| | Y3 | |
| | X4 | } INTERPOLATION POINT |
| | Y4 | |
| | X5 | } INTERPOLATION POINT |
| | Y5 | |
| | X6 | } NODE N0 |
| | Y6 | |
| LINK NO. C | | |
| | X7 | } INTERPOLATION POINT |
| | Y7 | |
| | X8 | } INTERPOLATION POINT |
| | Y8 | |
| | X9 | } NODE N3 |
| | Y9 | |
| LINK NO. E | | |

FIG. 15B

| BIT | DETAILS | |
|---|---|---|
| 15 - 11 | ONE-WAY TRAFFIC | ① NO ONE-WAY ROAD |
| | | ② ONE-WAY TRAFFIC IN FORWARD DIRECTION *1 |
| | | ③ ONE-WAY TRAFFIC IN REVERSE DIRECTION *2 |
| | | ④ NO TRAFFIC IN BOTH DIRECTIONS *3 |
| | CLASSIFICATIONS OF WIDTHS *4 | ⑤ LESS THAN 5.5m OR NOT KNOWN |
| | | ⑥ 5.5 THROUGH 13m (OR ONE THROUGH 2 LANES) |
| | | ⑦ 13m OR MORE (OR THREE THROUGH 4 LANES) |
| | | ⑧ 5 THROUGH 6 LANES OR MORE |

\*1  1-WAY TRAFFIC IN THE FORWARD DIRECTION MEANS THAT TRAVELING IS ALLOWED ONLY IN THE DIRECTION WHICH CONFORMS TO THE ORDER IN WHICH LINK STRING DATA POINTS ARISE.

\*2  1-WAY TRAFFIC IN THE REVERSE DIRECTION MEANS THAT TRAVELING IS ALLOWED ONLY IN THE DIRECTION WHICH IS REVERSE FROM THE ORDER IN WHICH LINK STRING DATA POINTS ARISE.

\*3  NO TRAFFIC ALLOWED IN BOTH DIRECTIONS MEANS THAT TRAVELING IS NOT ALLOWED EITHER IN THE DIRECTION CONFORMING TO THE ORDER IN WHICH THE LINK STRING DATA POINTS ARISE OR IN THE DIRECTION THAT IS REVERSE.

\*4  THE TOTAL NUMBER OF LANES FOR BOTH FORWARD AND REVERSE DIRECTIONS IS INDICATED AS THE NUMBER OF LANES. WHEN FORWARD DIRECTION LANES AND REVERSE DIRECTION LANES ARE SEPARATED, THE NUMBER OF LANES IS INDICATED SEPARATELY FOR THE FORWARD DIRECTION AND REVERSE DIRECTION.

FIG. 17A

| ATTRIBUTE 1 + X COORDINATE |
|---|
| ATTRIBUTE 2 + Y COORDINATE |

(2 WORDS)

FIG. 17B

| ATTRIBUTE 1 + X COORDINATE |
|---|
| ATTRIBUTE 2 + Y COORDINATE |
| IDENTICAL NODE OFFSET |

(3 WORDS)

FIG. 17C

| ATTRIBUTE 1 + X COORDINATE |
|---|
| ATTRIBUTE 2 + Y COORDINATE |
| IDENTICAL NODE OFFSET |
| GUIDE OFFSET (OR LINK NO.) |

(4 WORDS)

FIG. 17D

| ATTRIBUTE 1 + X COORDINATE |
|---|
| ATTRIBUTE 2 + Y COORDINATE |
| IDENTICAL NODE OFFSET |
| GUIDE OFFSET |
| LINK NO. |

(5 WORDS)

FIG. 18B

| BIT | DETAILS | |
|---|---|---|
| 15, 14 | OFFSET TO IMMEDIATLY PRECEDING | (1) 2 WORDS UP TO THE HEADER POSITION OF THE IMMEDIATELY PRECEDING ELEMENT POINT |
| | | (2) 3 WORDS UP TO THE HEADER POSITION OF THE IMMEDIATELY PRECEDING ELEMENT POINT |
| | | (3) 4 WORDS UP TO THE HEADER POSITION OF THE IMMEDIATELY PRECEDING ELEMENT POINT |
| | | (4) 5 WORDS UP TO THE HEADER POSITION OF THE IMMEDIATELY PRECEDING ELEMENT POINT |

MAP DATABASE APPARATUS

CROSS-REFERENCE TO RELATED APPLICATION

This application is a continuation-in-part of U.S. application U.S. Ser. No. 08/634,853 filed on Apr. 19, 1996.

BACKGROUND OF THE INVENTION

1. Field of the Invention

The present invention relates to a map database apparatus which, preferably mounted in a navigation system for vehicles and the like, is used in road map display, map matching, calculation of a recommended route and the like.

2. Description of the Prior Art

Vehicular navigation systems in the known art are provided with a function for displaying a road map of the area where the vehicle is currently located, a function for accurately detecting the vehicle position through map matching, a function for calculating a recommended route from a point of departure to a destination and the like. In these vehicular navigation systems in the prior art, data for road map display, data for map matching and data for route search are separately stored in a CD-ROM or the like in order to maintain compatibility with existing software programs and also to improve the processing speed.

The data for road map display includes the widest range map data which has the smallest scale and is for displaying the widest range area, and the most detailed map data which has the largest scale and is for displaying the most narrow range area in detail, and a plurality of map data which have various scales between the widest range map and the most detailed map. For example, the widest range map data is denoted as data of level 4, the most detailed map data is denoted as data of level 1, and data between level 4 and level 1 are denoted as data of level 3 and data of level 2, respectively.

FIGS. 25A and 25B explain the road map of the data for road map display which is stored as above mentioned level 4 and level 3. The CD-ROM stores the data for road map display of level 4 and the data for road map display of level 3 respectively. FIG. 25A shows a road map of a mesh M4 in level 4, and in this mesh M4 one road D1 and two roads D2 and D3 which are connected to intersections C1 and C2 located at both ends of the road D1 are shown. A small area m3 in level 4 which is hatched and is one of 16 parts into which the mesh M4 is divided) corresponds to a mesh M3 in level 3. As shown in FIG. 25B, a road D4 which is a part of the road D1 is only shown in the mesh M3.

For example, if a detail button is operated when the road map of the mesh M4 of level 4 is displayed on a monitor, then the road map of the mesh M3 of level 3 is displayed. In this case, however, an identifying data which shows that the road D1 and the road D4 are identical is not used. Consequently, it is difficult to know that they correspond to each other between the levels. And also, there is the same problem in the data for route search. In recommended route data which results from route search, it is difficult to know which portions are corresponding to each other between data which results from route search in level 2 and data which results from route search in level 4. Further, since identifying data which shows the identical road between the data for road map display and the data for route search is not used, it is difficult to know the correspondence of the identical road when the recommended route data is interposed onto the data for road map display.

SUMMARY OF THE INVENTION

The object of the present invention is to provide a map database apparatus which makes it to know the correspondence of data between maps which have different scales.

The present invention achieves this object by providing the following map database apparatuses.

According to the 1st aspect of the present invention, the present invention is applied to a map database apparatus, where: a road is represented as a link string in which a plurality of links, each of which has nodes at both ends thereof, are connected; and a plurality of link string data, each of which includes node information relating to the node and is respectively provided for each of the levels which correspond to different scale maps with regard to an identical link string, are stored. And a link of a lower level which has a larger scale, the link being common to a link of an upper level which has a smaller scale, has a link identifying data which is common to a link identifying data of the common link of the upper level. Consequently, it becomes easy to know the correspondence of link string data which have different map scales, and the reliability of data processing can be improved and the time for data processing can be reduced.

According to the 2nd aspect of the present invention, in the link string data, node information relating to a node which connects adjacent links is shared with the adjacent links. Consequently, storage capacity of the map data base apparatus can be reduced.

According to the 3rd aspect of the present invention, a node of the lower level which has the larger scale, the node being common to a node of the upper level which has the smaller scale, has a node identifying data which is common to a node identifying data of the common node of the upper level. Consequently, the same advantage as the 1st aspect further increases.

According to the 4th aspect of the present invention, the node information relating to the node includes a link identifying data of a link which is next connected to the node. Consequently, information of link connections can be obtained with a small storage capacity.

According to the 5th aspect of the present invention, in the link string data the node information relating to the nodes are arranged in connecting order of the links; and the plurality of the link string data which are respectively provided have a common direction of the connecting order of the links with regard to an identical link string. Consequently, it becomes more easier to know the correspondence of link string data which have different map scales, and the reliability of data processing can be improved and the time for data processing can be reduced.

According to the 6th aspect of the present invention, the node information includes information relating to a node position on a map. Consequently, the node position on the map can be obtained.

BRIEF DESCRIPTION OF THE DRAWINGS

FIGS. 8A and 8B show the data structure of route display data.

FIG. 9 shows an example in which two roads intersect in a meshed range.

FIG. 12 shows the link string data of the road indicated with the bold lines in FIG. 11.

FIG. 15B shows traffic regulation information, road width information and number of lanes information added to the link string data.

FIGS. 17A thorough 17D show varying data volumes of node information and interpolation point information.

FIG. 18B shows offset information to be added to the link string data to read out immediately preceding data.

DESCRIPTION OF THE PREFERRED EMBODIMENT

Figure 1:
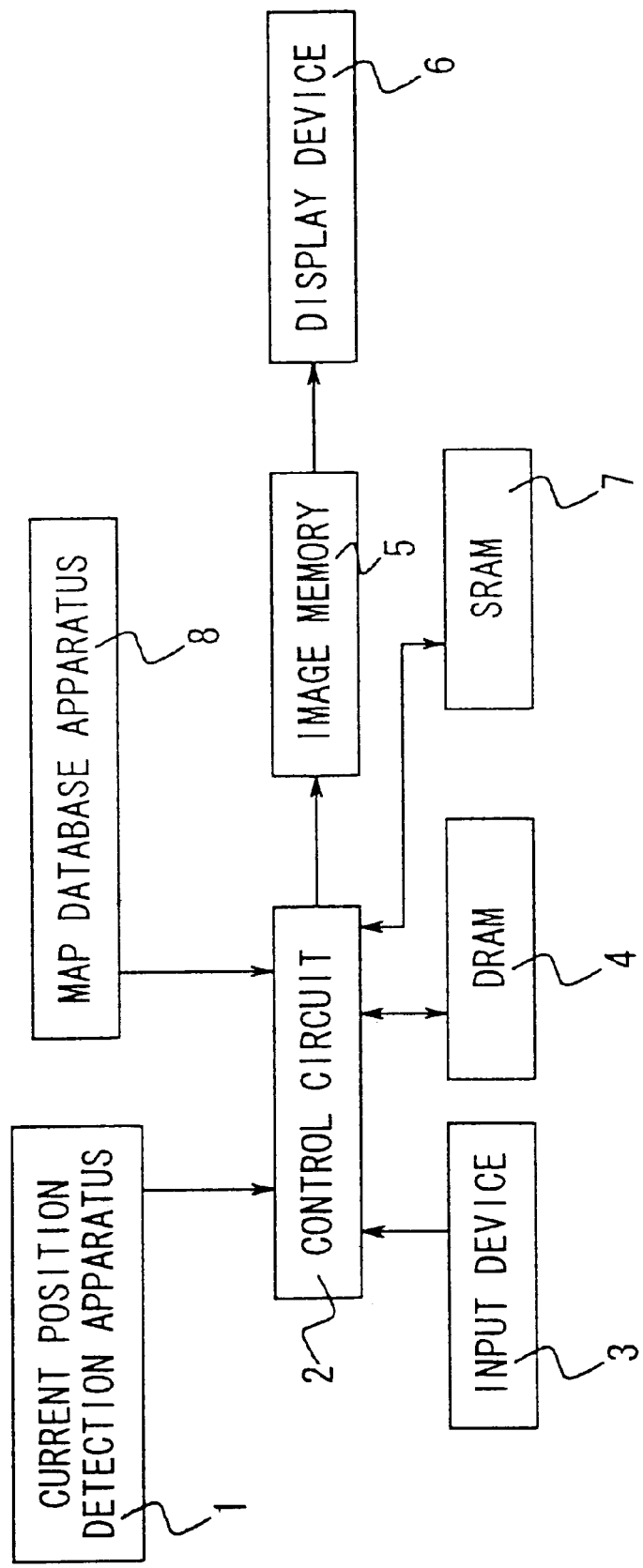
FIG. 1 shows a block diagram of an embodiment of a navigation system for vehicles in which a map database apparatus according to the present invention is mounted.

FIG. 1 is a block diagram of an embodiment of a navigation system for vehicles that is internally provided with a map database apparatus according to the present invention. In FIG. 1, reference number 1 indicates a current position detection apparatus that detects the current position of a vehicle, which is constituted with, for instance, an azimuth sensor which detects the azimuth of a vehicle during travelling, a vehicle speed sensor that detects the speed of the vehicle, a GPS sensor which detects a GPS signal from a GPS (Global Positioning System) satellite and the like.

Reference number 2 indicates a control circuit that controls the entire system and is constituted with a microprocessor and peripheral circuits. Reference number 3 indicates an input apparatus for inputting destinations and the like for vehicles, reference number 4 indicates a DRAM that stores vehicle position information and the like detected by the current position detection apparatus 1, reference number 5 is an image memory that stores image data for display on a display device 6 and image data stored in the image memory 5 are read out as necessary to be displayed on the display device 6. Reference number 7 indicates an SRAM that stores node information, link information and the like on the recommended route calculated by the control circuit 2.

Reference number 8 indicates a map database apparatus that stores various types of data for performing road map display, route search, map matching and the like, which is constituted with, for instance, a CD ROM device, a magnetic recording device and the like. In the map database apparatus 8, map display data that are constituted with information related to road physical forms, road classifications and the like, and route search data that are constituted with branching point information, intersection information and the like that are not directly related to road physical forms, are stored. The map display data are mainly used when displaying a road map on the display device and the route search data are mainly used when calculating a recommended route. Both data will be explained in detail after.

Also, both the map display data and the route search data include a plurality of sets of data at varying scales and, in this embodiment, the data for each scale is referred to as data at level n (n may be, for instance, 1 through 5). An example in which route search is performed using map display data and route search data at levels 2 and 4 of these levels, is explained below. Note that a road map at level 1 is the most detailed, and as the level number goes up the amount of detail decreases and the road map becomes a wider range map which has a smaller scale. Here, the smaller scale means that a scale of 1/40000 is smaller than a scale of 1/10000, and the smaller scale map shows a wide range area map. Also, in this embodiment, link nos. and node nos. are used commonly at various levels to facilitate the handling of corresponding data at varying levels.

Figure 2:
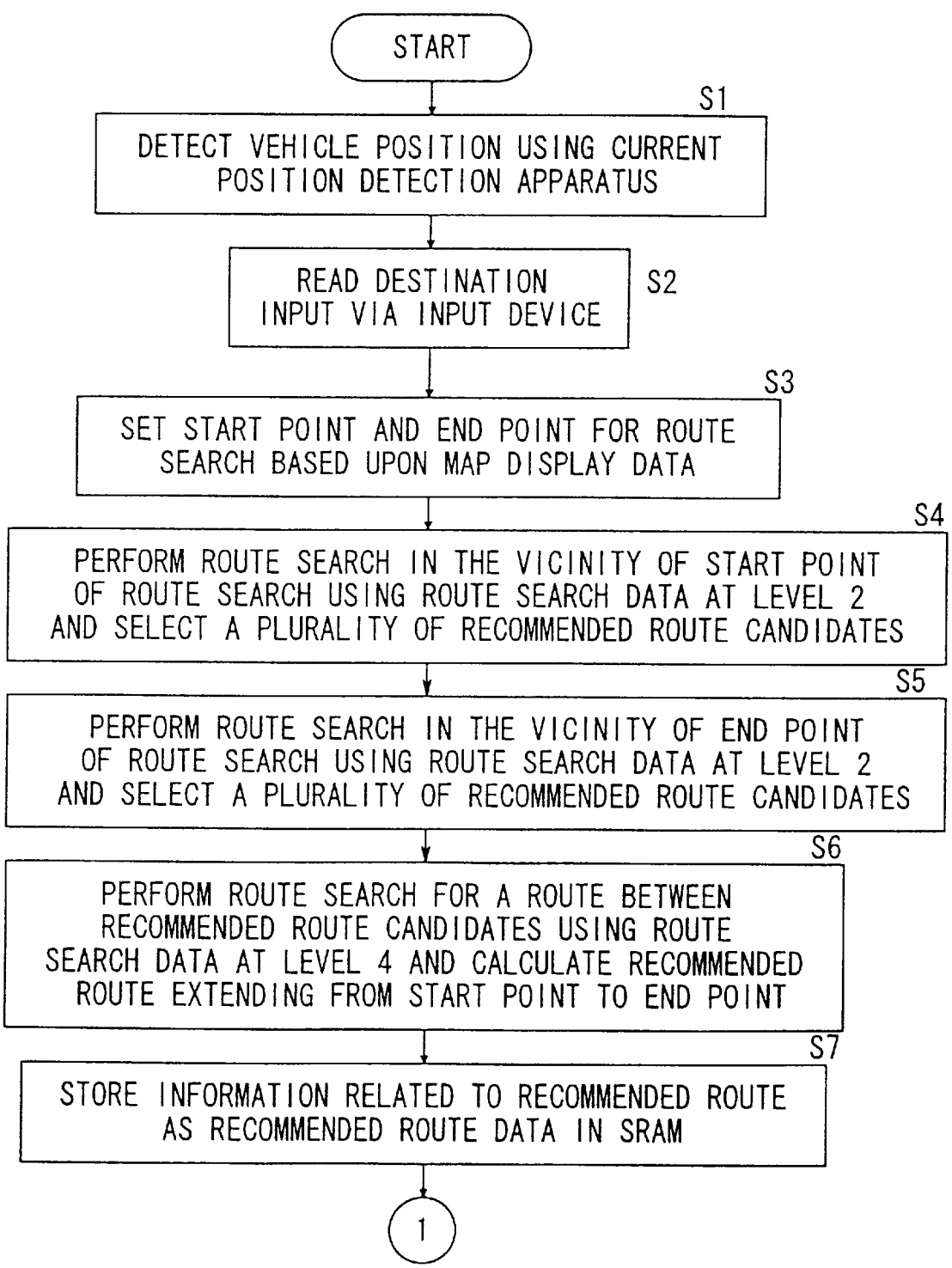
FIG. 2 shows a flow chart outlining the main processing performed by a control circuit.
Figure 3:
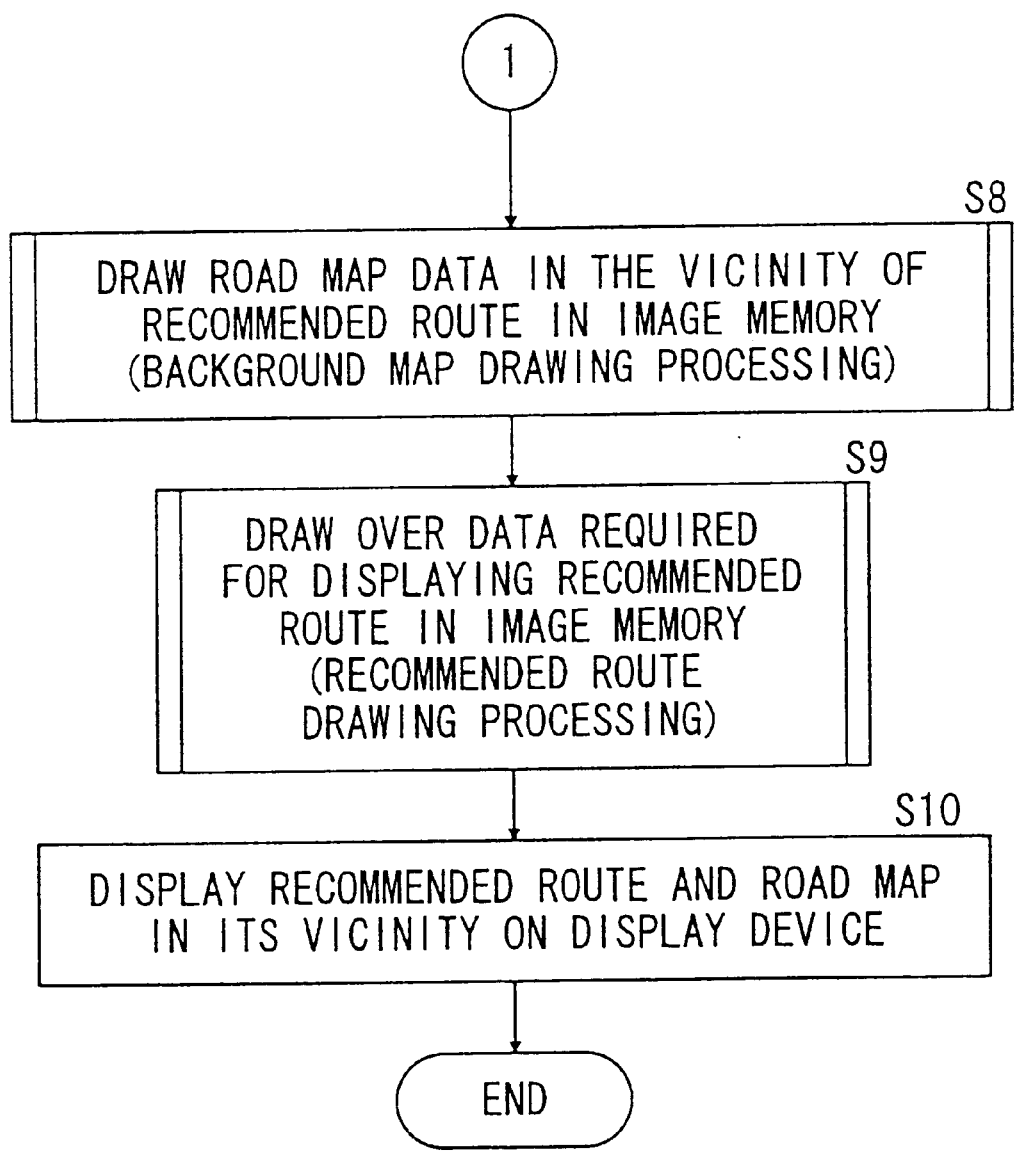
FIG. 3 shows a flow chart continuing from FIG. 2.

FIGS. 2 and 3 are a flow chart which illustrates the outline of the main processing performed by the control circuit 2. In step S1 in FIG. 2, the vehicle position is detected by the current position detection apparatus 1. In step S2, the destination, which has been input via the input apparatus 3, is read in. In step S3, based upon the map display data stored in the map database apparatus 8, the start point and the end point of the route search are set on roads for which route search is possible. For instance, the start point is the current position of a vehicle and the end point is the destination.

In step S4, using route search data at level 2, route search in the vicinity of the start point of the route search is performed, and a plurality of candidates for the recommended route in the vicinity of the start point are selected. In step S5, using route search data at level 2, route search in the vicinity of the end point of the route search is performed, and a plurality of candidates for the recommended route in the vicinity of the end point are selected.

In step S6, using route search data at level 4, route search is performed for routes between the candidates for the recommended routes selected in step S4 and step S5, and a recommended route from the start point to the end point is calculated.

Route search data at different levels are used for the vicinities of the start point and the end point, and the middle range between the start point and the end point in this manner because if route search is performed using route search data at level 2 for the entire route, the data quantity will be very large and, as a result, the calculation time required in route search will increase. In step S7, the information related to the recommended route calculated in step S6 is stored in the SRAM 7 as recommended route data.

Figure 4:
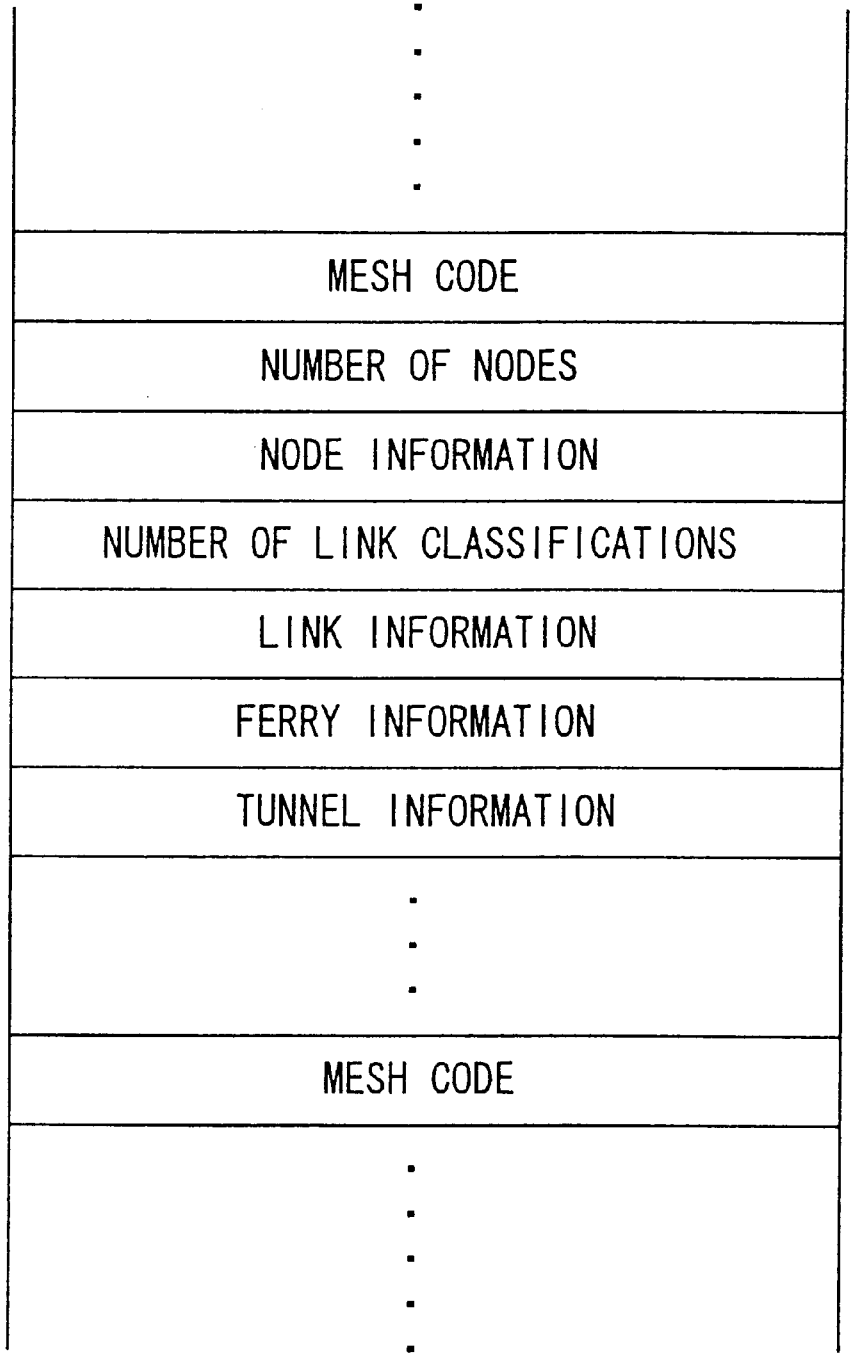
FIG. 4 shows an outline of the data structure of recommended route data.

FIG. 4 shows an outline of the data structure of recommended route data. In the recommended route data, node information and link information on the recommended route are stored, while classified in units of meshed ranges. Note that a meshed range refers to a partitioned range when a road map is partitioned into units of specific ranges.

Figure 5:
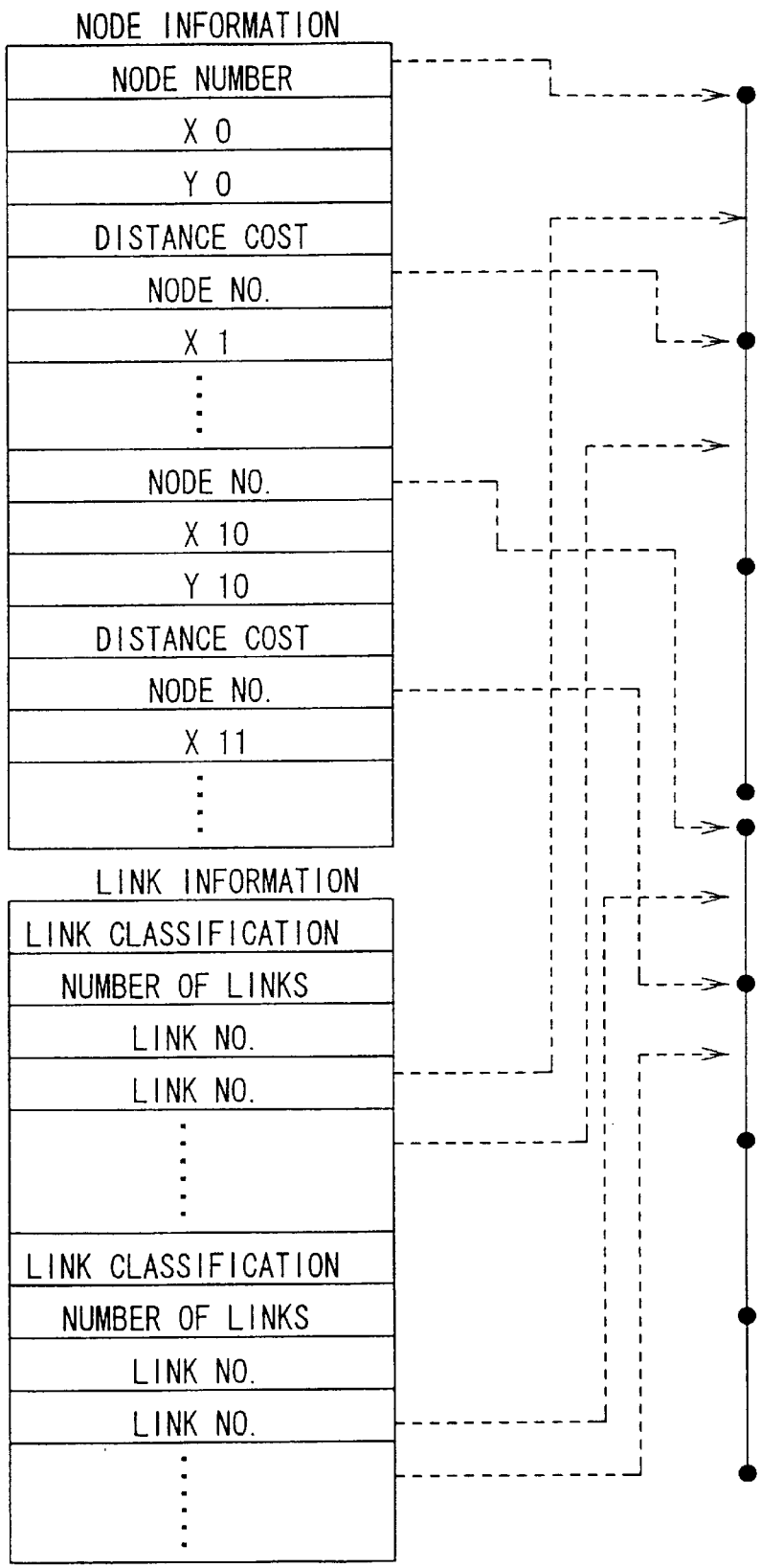
FIG. 5 shows the data structure of node position information and link position information.

As shown in FIG. 4, the recommended route data are constituted with mesh code, the number of nodes, node information, the number of link classifications, link information, ferry information and tunnel information. The number for identifying the meshed range is stored in a storage area of the mesh code, the number of nodes present within a meshed range is stored in a storage area of the number of nodes and, as shown in detail in FIG. 5, the node no. and the positional coordinates and the like of each node within a meshed range are stored in a storage area of the node information. In addition, the number of link classifications that are present inside a meshed range is stored in a storage area of the number of link classifications and as shown in detail in FIG. 5, the link specification, link no. and the like of each link within a meshed range are stored in a storage area of the link information.

Note that recommended route data are prepared at different levels and, in this embodiment, recommended route data at level 2 are prepared for the vicinities of the start point and the end point on the recommended route while recommended route data at level 4 are prepared for the middle range between the start point and the end point, as described above.

Figure 6:
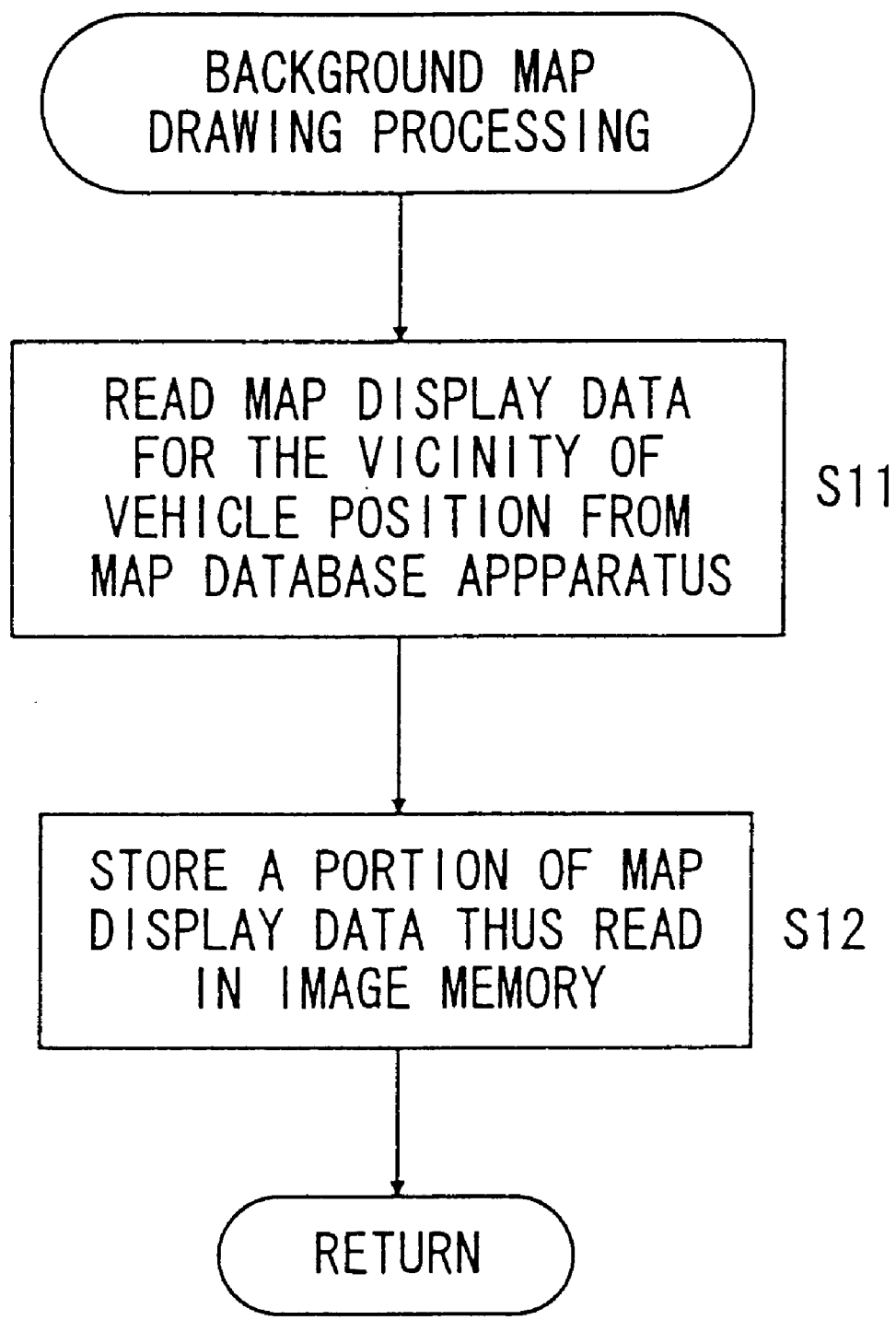
FIG. 6 shows a detailed flow chart of the background map drawing processing performed in step S8 in FIG. 3.

When the processing performed in step S7 in FIG. 2 is completed, the operation proceeds to step S8 shown in FIG. 3, in which the background map drawing processing, the details of which are shown in FIG. 6, is performed to draw (store) data related to the road map in the vicinity of the recommended route for display on the display device 6 in the image memory 5. First, in step S11 in FIG. 6, map display data corresponding to the vicinity of the current vehicle position are read from the map database apparatus 8. Next, in step S12, a portion of the map display data thus read, is drawn (stored) in the image memory 5.

When the processing performed in step S12 in FIG. 6 is completed, the operation proceeds to step S9, shown in FIG. 3, in which the data required to display the recommended route calculated in step S6 are also drawn over (stored) in the image memory 5. The recommended route drawing processing performed in step S9 is described in more detailed later. In step S10, the data stored in the image memory 5 are read out and the recommended route and the road map in the vicinity are displayed on the display device 6.

Figure 7:
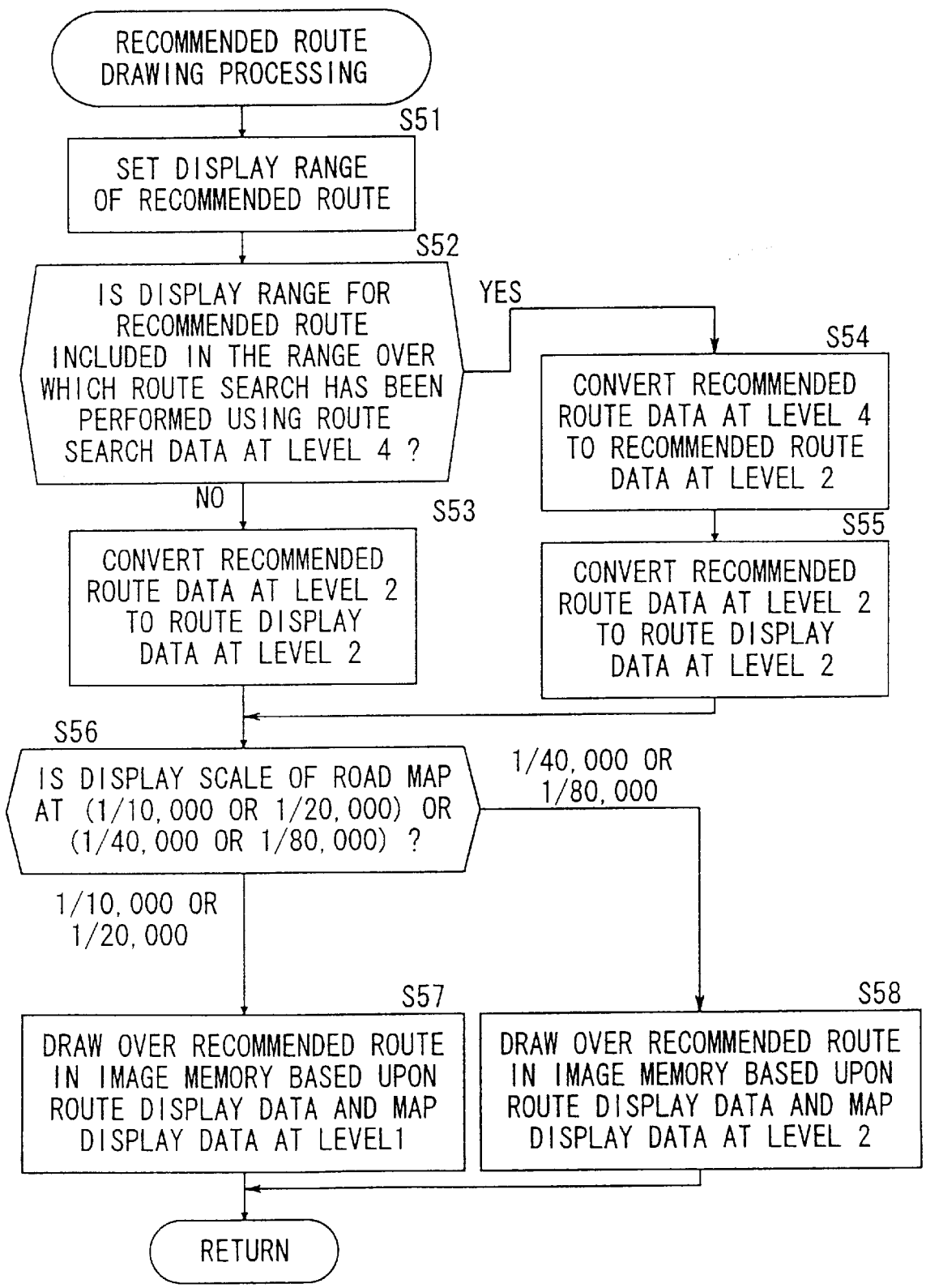
FIG. 7 shows a detailed flow chart of the recommended route drawing processing performed in step S9 in FIG. 3.

FIG. 7 is a detailed flow chart of the recommended route drawing processing performed in step S9 in FIG. 3. In step S51 in FIG. 7, in correspondence to the road map range to be displayed on the display device 6, the display range of the recommended route is set. In step S52, a decision is made as to whether or not the display range of the recommended route is included in the range over which the route search was performed using the route search data at level 4. If a negative decision is made, the operation proceeds to step S53 to convert the recommended route data at level 2 stored in the SRAM 7 to route display data at level 2.

FIG. 8A shows the data structure of the route display data. As shown in the figure, route display data are constituted with mesh code, the number of link classifications, position information word size, ferry information word size, position information, ferry information, route block attributes and start point/end point link information. Of these components, the link classification, the number of links and the link nos. are stored in a storage area of the position information for each link string, as shown in detail in FIG. 8B. In a storage area of the ferry information, the positional coordinates and the like of the ferry ports within the meshed range are stored. In addition, in a storage area of the start point/end point link information, link information corresponding to the vehicle position and the vicinity of the destination is stored.

If, on the other hand, an affirmative decision is made in step S52 in FIG. 7, the operation proceeds to step S54 to convert the recommended route data at level 4 stored in the SRAM 7 to recommended route data at level 2. In step S55, the recommended route data at level 2 are converted to route display data at level 2.

When the processing performed in step S53 or S55 in FIG. 7 is completed, the operation proceeds to step S56, in which a decision is made as to whether the display scale of the road map is set at (1/10,000 or 1/20,000) or (1/40,000 or 1/80,000). If the setting is at (1/10,000 or 1/20,000), the operation proceeds to step S57, in which the recommended route is drawn over in the image memory 5, based upon the route display data and the road classifications and the link nos. in the map display data at level 1.

If, on the other hand, a decision is made in step S56 that the scale is set at (1/40,000 or 1/80,000), the operation proceeds to step S58, in which the recommended route is drawn over in the image memory 5 based upon the route display data and the road classifications and the link nos. in the map display data at level 2.

Next, the data structures of the map display data and the route search data stored in the map database apparatus 8 are described.

[1] Map Display Data (1) Overview of Link String Data

Data management of the map display data in this embodiment is performed for each meshed range representing one of the partitioned areas of a road map corresponding to specific ranges, and individual roads present in a meshed range constitute separate link strings. For instance, as shown in FIG. 9, when two routes intersect, in one meshed range, the two roads constitute 2 separate link strings A and B. The link string A is constituted with links A1 and A2, and the link string B is constituted with links B1 and B2. In this case, the links A1 and A2 of the link string A and the links B1 and B2 of the link string B have an identical road classification, for instance a national highway. Each of the links A1 through B2 is a minimum unit to express a road, and these links are distinguished from one another with inherent numbers (hereafter referred to as link nos.) assigned to individual links.

Figure 10:
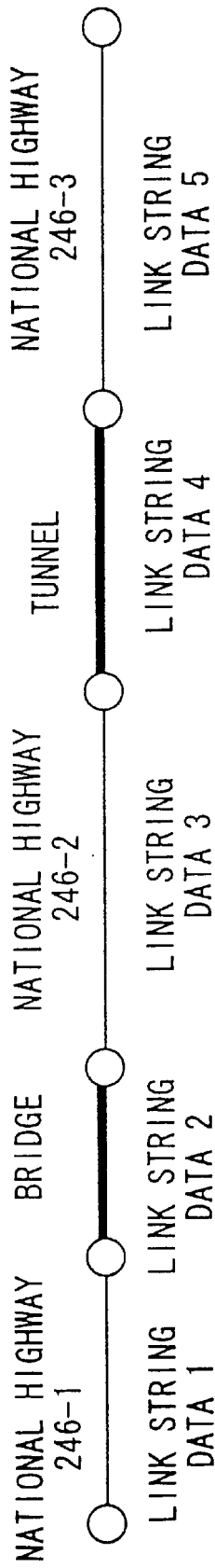
FIG. 10 shows an illustration of link string units.

Also, in this embodiment, when there is a distinct structure such as a bridge, a tunnel or the like, on a road, the portions of the road preceding and following the structure constitute separate link strings. For instance, when there is a bridge and a tunnel on National Highway 246, as shown in FIG. 10, the portions preceding the bridge and the tunnel, the blocks corresponding to the bridge and the tunnel and the portions following the bridge and the tunnel all constitute separate link strings. In FIG. 10, these strings are designated by link string data 1 through 5. By making the portions preceding and following a distinctive structure on a road separate link strings, search of bridges, tunnels and the like on a road map is facilitated.

(2) Data Structure of Link String Data

Figure 11:
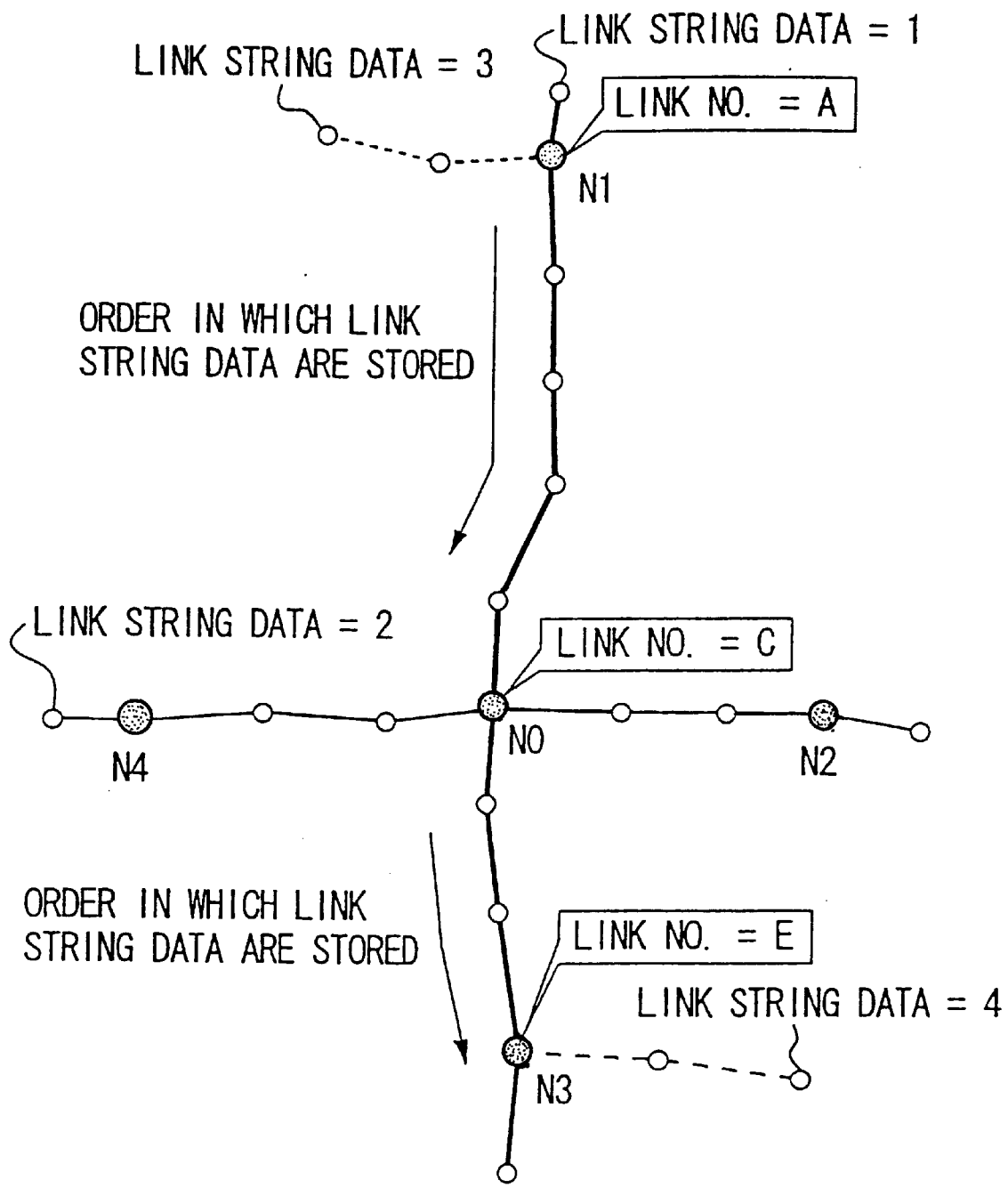
FIG. 11 shows an example of a road map with a plurality of nodes and a plurality of interpolation points.

In the map display data, link string data which describe various types of information related to the link string are provided for each link string. For instance, the link string data for the link string indicated with the bold lines in FIG. 11, are structured as shown in FIG. 12. As shown in the figure, the link string data are constituted with node information which is related to nodes (points indicated with black circles in FIG. 11) on a link string and interpolation point information, which is related to interpolation points (the points indicated with white circles in FIG. 11). Node information includes the positional coordinates X, Y of the nodes and the link nos. of the links to be connected to the nodes. Interpolation point information includes the positional coordinates X, Y of the interpolation points. A road indicated with the bold lines in FIG. 11 is link string data no.1. A link of link no. A is between node N0 and node N3. A link of link no. C is between node N0 and node N3. Information of node N0 is jointly owned by the link of link no. A and the link of link no. C. The information, i.e., the node information and the interpolation point information, is set in an order of connections of links in data arrangement. Because of this, by reading out link string data sequentially from the starting address, the road physical forms, the road classification and the like for the entire link string can be detected.

Thus, in this embodiment, since data are managed in units of link strings and position information of a node between adjacent links is jointly owned by the links in one meshed range, the entire volume of data can be reduced in comparison to the prior art, in which data are managed in units of links.

(3) Offset Information for Indicating Identical Nodes

Figure 13:
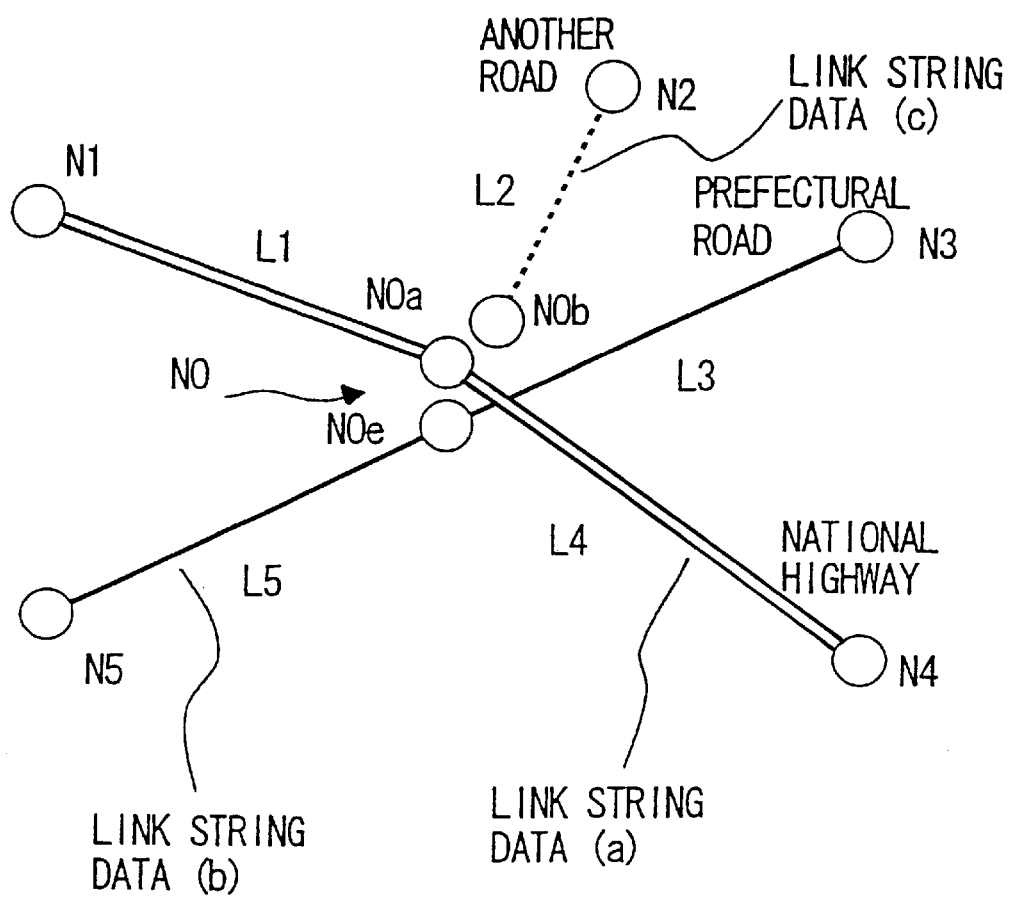
FIG. 13 shows the data management method employed in this embodiment that corresponds to the road map in FIG. 24.
Figure 14:
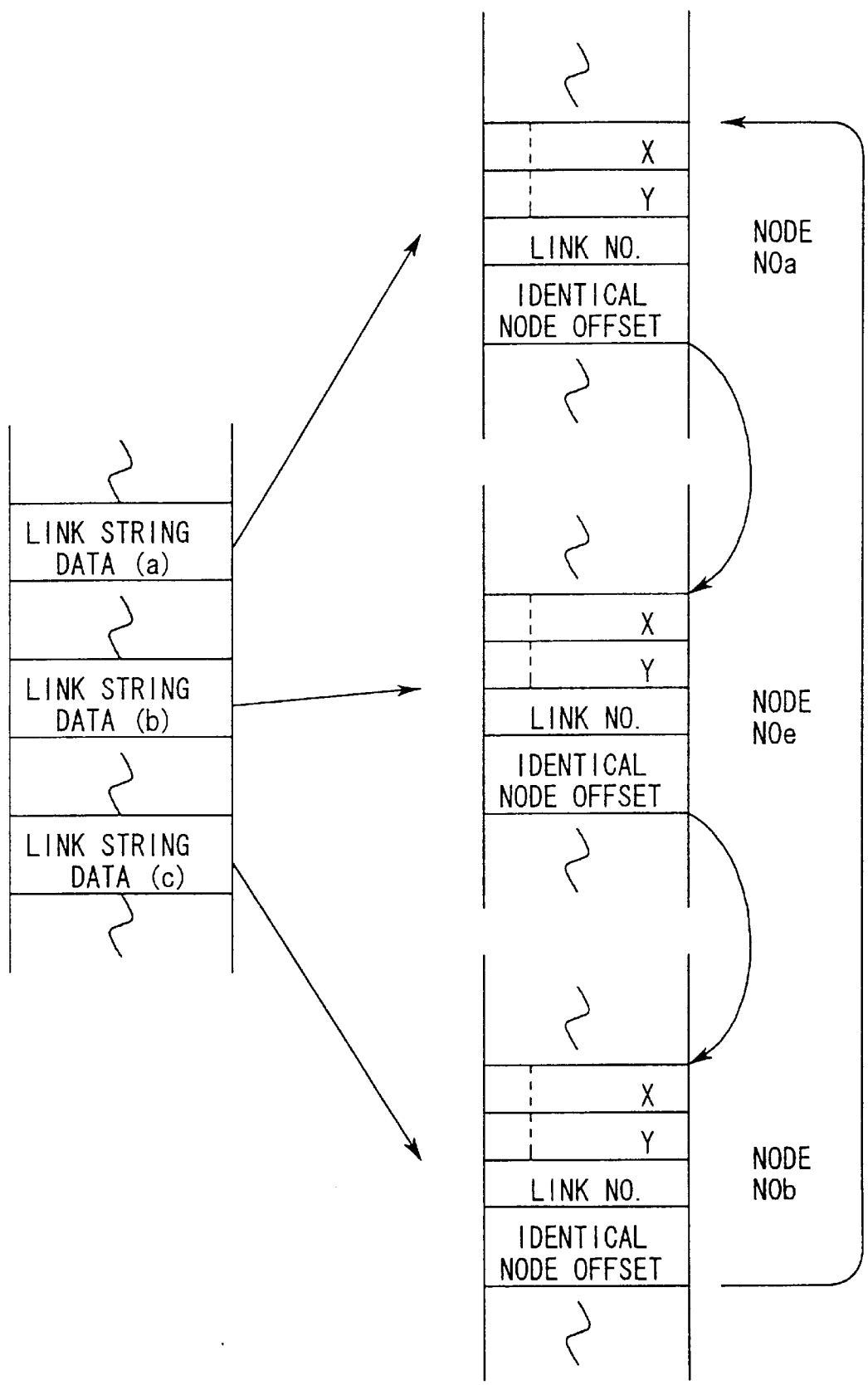
FIG. 14 shows the data structure of the link string data which corresponds to FIG. 13.

The data structure of the map display data which corresponds to FIG. 13 is as shown in FIG. 14. As shown in the figure, link string data (a) on a national highway, link string data (b) on a prefectural road and link string data (c) on a general road are set together in data arrangement. The link string data (a) is constituted with links L1 and L4, and nodes N1, N0a and N4. The link string data (b) is constituted with links L3 and L5, and nodes N3, N0c and N5. The link string (c) is constituted with link L2 and nodes N2 and N0b. Management of the intersection N0 is performed with separate sets of node information attached to the individual sets of link string data. In other words, the link string data (a) is assigned to the node N0a, the link string data (b) is assigned to the node N0c, and the link string data (c) is assigned to the node N0b. Those sets of node information for the intersection N0a through N0c each include a data item which is referred to as identical node offset.

For instance, the address value that indicates a storage area of the node information in the link string data (b) is stored as the identical node offset of the link string data (a), and likewise, the address value which indicates a storage area of the node information in the link string data (c) is stored as the identical node offset of the link string data (b), and also, the address value indicating a storage area of the node information in the link string data (a) is stored as the identical node offset of the link string data (c).

As for nodes other than the intersection N0 in FIG. 13, since they do not intersect other roads, in a storage area of the identical node offset of node information for these nodes, a specific value, i.e., FFFFh, that indicates that another node relating to an identical node does not exist is stored.

By providing the identical node offset in this manner, even when there are a plurality of sets of node information in regard to identical nodes, the corresponding relationships among the individual sets of node information can be easily ascertained. Also, only 3 nodes are required in this embodiment, as shown in FIG. 13, achieving a reduction in the data volume.

Figure 15A:
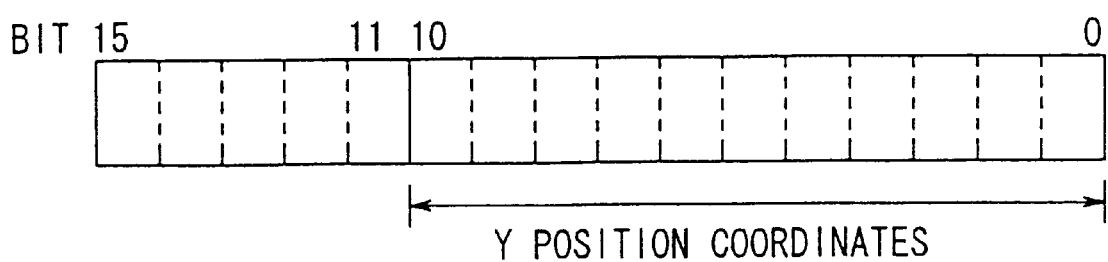
FIG. 15A shows an example of the data structure of the link string data.

(4) Traffic Regulation Information, Road Width Information, Number of Lanes Information The data length of each set of data constituting link string data is 16 bits (2 bytes=1 word) and the positional coordinates of nodes and interpolation points and the like are stored in the lower order 11 bits of each set of data with various types of attribute information stored in the upper order 5 bits. FIG. 15A shows an example in which the Y positional coordinates are stored in the lower order 11 bits, with traffic regulation information, road width information and number of lanes information stored in the upper order 5 bits. The upper order 5 bits are combined in a specific manner to select one type of information among types 1 through 8 in FIG. 15B.

Since the road width information, the traffic regulation information and number of lanes information are stored by utilizing unused bits of the 2-byte data for storing positional coordinates and the like of nodes in this manner, the road width information, the traffic regulation information and the like can be added to the link string data without increasing the volume of data.

(5) Offset Information for Reading Out Link String Data in Reverse Direction

As explained earlier, the node information and the interpolation point information are set in the data arrangement in an order of actual connections of links in link string data. Because of this, by reading out the link string data from the start sequentially, the road physical forms can be accurately ascertained starting from the start position.

Figure 16:
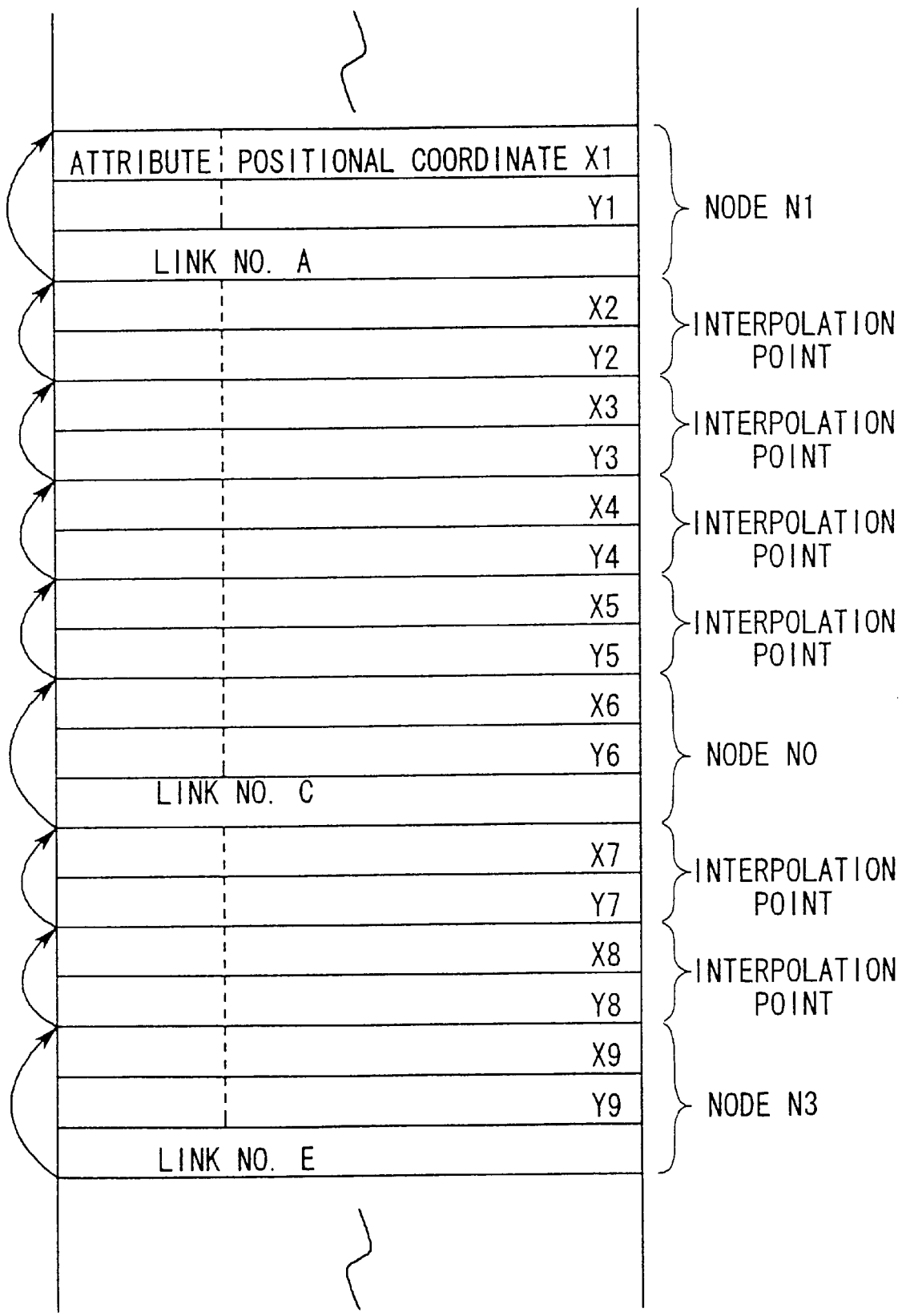
FIG. 16 shows the read method employed when reading out link string data from the end.

There are also situations in which it is necessary to ascertain the road physical forms from the end by reading out the link string data from the end. In such a case, after reading out the node information or the interpolation point information, the header position of the node information or the like that is set immediately before in data arrangement must be detected. For instance, when reading out the link string data for the road indicated with the bold line in FIG. 11 from the end, it is necessary to first read out the node information on the node N3 and then to detect the header position of the interpolation point information that is set immediately before in the data arrangement to read out the interpolation point information from this header position, as indicated with the arrows in FIG. 16. However, as explained below, the data volume of the node information and the interpolation point information varies among various nodes and interpolation points, and the header positions of node information and interpolation point information cannot be determined uniformly.

FIGS. 17A through 17D show varying data volumes of node information and interpolation point information, with FIG. 17A representing a case in which node information or the like is constituted with two words, i.e., the X and Y positional coordinates, FIG. 17B representing a case in which node information or the like is constituted with three words by adding identical node offset to the two words in FIG. 17A, FIG. 17C representing a case in which node information or the like is constituted of four words by adding guide offset information to the three words in FIG. 17B and FIG. 17D representing a case in which node information or the like is constituted of five words by adding link no. to the four words in FIG. 17C.

As shown in FIGS. 17A through 17D, since the data volume of node information or interpolation point information changes for various cases, the information that indicates the header positions of the node information and the interpolation point information is added to the link string data in advance in this embodiment.

Figure 18A:
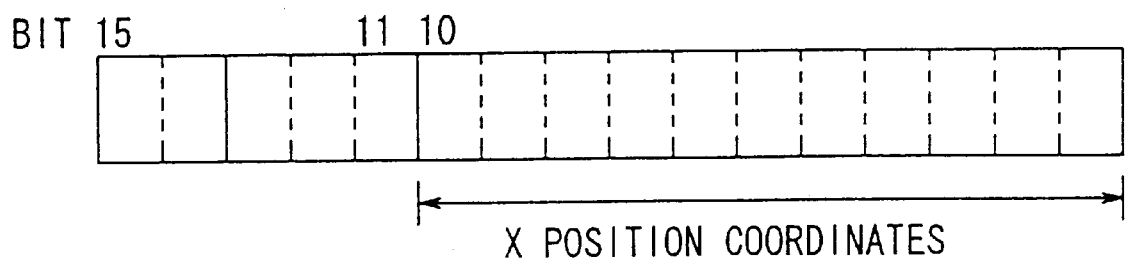
FIG. 18A shows an example of the link string data.

FIG. 18A shows an example in which the X positional coordinates are stored in the lower order 11 bits of the 2-byte data constituting the link string data and information that indicates the header positions of various sets of node information and the like is stored in the upper order 2 bits. The information that indicates the number of words that are present up to the header position of each set of node information or the like is stored in these upper order 2 bits (FIG. 18B).

Thus, since the information that indicates the header position of the immediately preceding set of node information or the like is added to the link string data in this embodiment, even when the link string data are read out in the reverse direction, the entire node information or the like can be read out without omissions.

(6) Altitude Information

Figure 19:
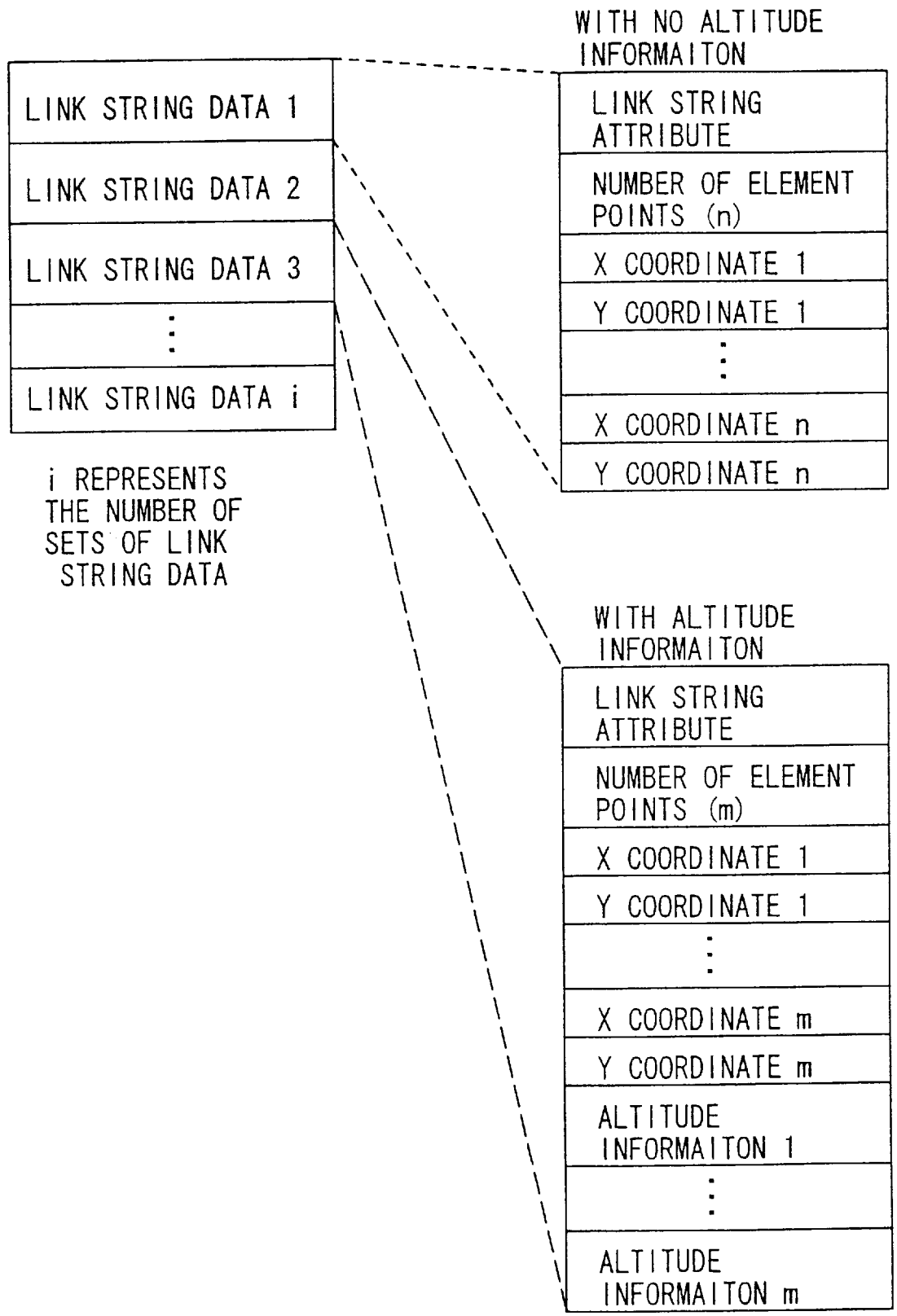
FIG. 19 shows altitude information to be added to the link string data.

When displaying a road map in three dimensions, data concerning the altitude differences among a plurality of points on the road map are required. Accordingly, in this embodiment, all the altitude information on the various links constituting a link string is added at the end of the link string data. Note that FIG. 19 shows an example in which link string data with altitude information and link string data without altitude information are present together.

By adding the altitude information to the link string data in this manner, a road map can be displayed in three dimensions. In addition, since all the altitude information is added together at the end of the link string data, the altitude information can be read out only when it is required and when the altitude information is not required, such as when displaying a regular flat map, for instance, only the data immediately preceding the altitude information need be read out.

(7) Supplementary Explanation of Correspondence of Data Among Different Levels

Figure 26:
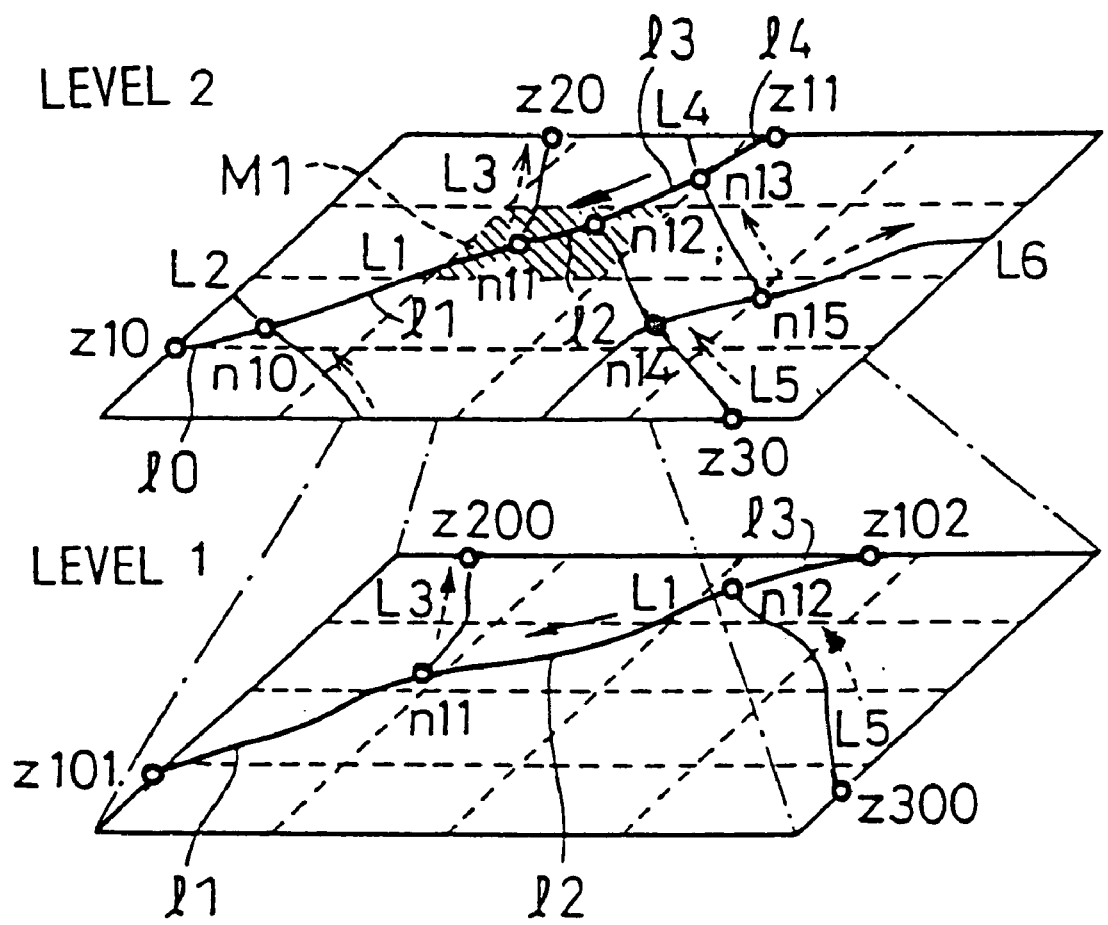
FIG. 26 explains handling of an identical link string between different levels.

As explained before, in this embodiment, link numbers and node numbers are used commonly at various levels. This will be explained more referring to FIG. 26. FIG. 26 shows a view explaining dealing with the common link string among different levels. In FIG. 26, level 1 is a level of the most detailed map at the largest scale, and level 2 is a level of the wider range map at the smaller scale than the map at level 1. In the map of level 2, link strings L1 through L6 are shown, and in the map of level 1, the hatching portion M1 in level 2 is enlarged and link strings L1, L3 and L5 are shown. As to link string L1, in level 2 link 4 ("l4"), node n13, link 3 ("l3"), node n12, link 2 ("l2"), node n11, link 1 ("l1"), node 10 and link 0 ("l0") are lined in order in a direction of the arrow in the figure. And in link string L1 of level 1, link 3 ("l3"), node n12, link 2 ("l2"), node n11 and link 1 ("l1") are lined in order in a direction of the arrow as well as the above. Here, link numbers 3 ("l3") and 2 ("l2") and node numbers n12 and n11 are commonly used on the link string data between level 1 and level 2. Since, data are arranged in order of connections of links in the link string data as explained before, the connection order is also common among levels.

(2) Route Search Data

Figure 20:
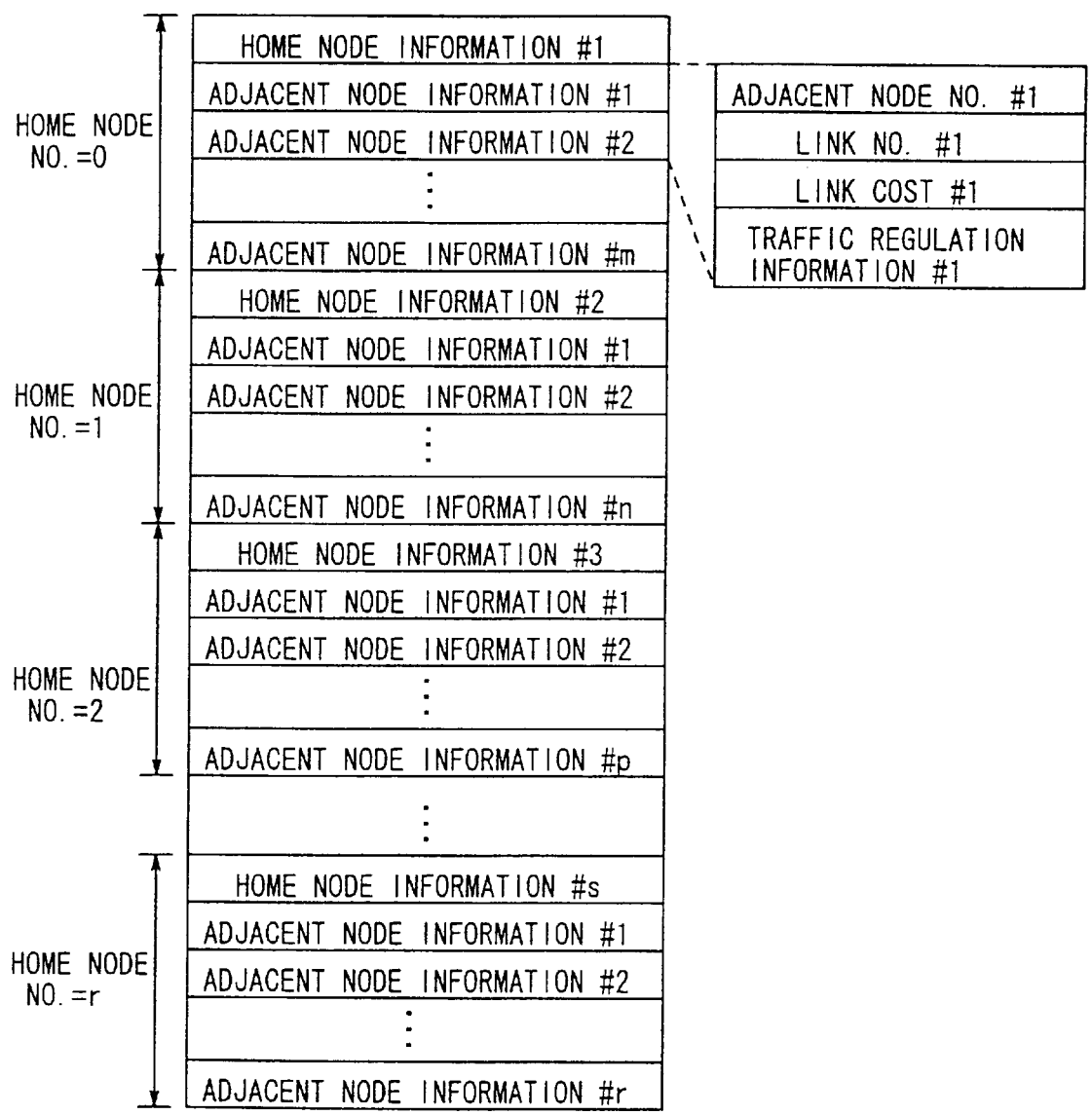
FIG. 20 shows data structure of the route search data.

FIG. 20 shows the data structure of route search data. As shown in the figure, in the route search data, node information which indicates the connecting relationship with other nodes is stored for each connecting point (node) of links, which are the minimum units for expressing a road physical form. Each set of node information is constituted with home node information and adjacent node information, with the node positional coordinates stored in the home node information. In the adjacent node information, as shown in the figure, the adjacent node no., the link no. of the link from the home node to the adjacent node, the link cost of that particular link and traffic regulation information on that link are stored. Also, various sets of node information are stored in an order of connections of links and the node no. of the home nodes can be ascertained by the order in which it is stored. Because of this, even without storing the node no. of the home nodes as home node information, the node no. of the home nodes can be ascertained, achieving a reduction in memory requirement.

Figure 21:
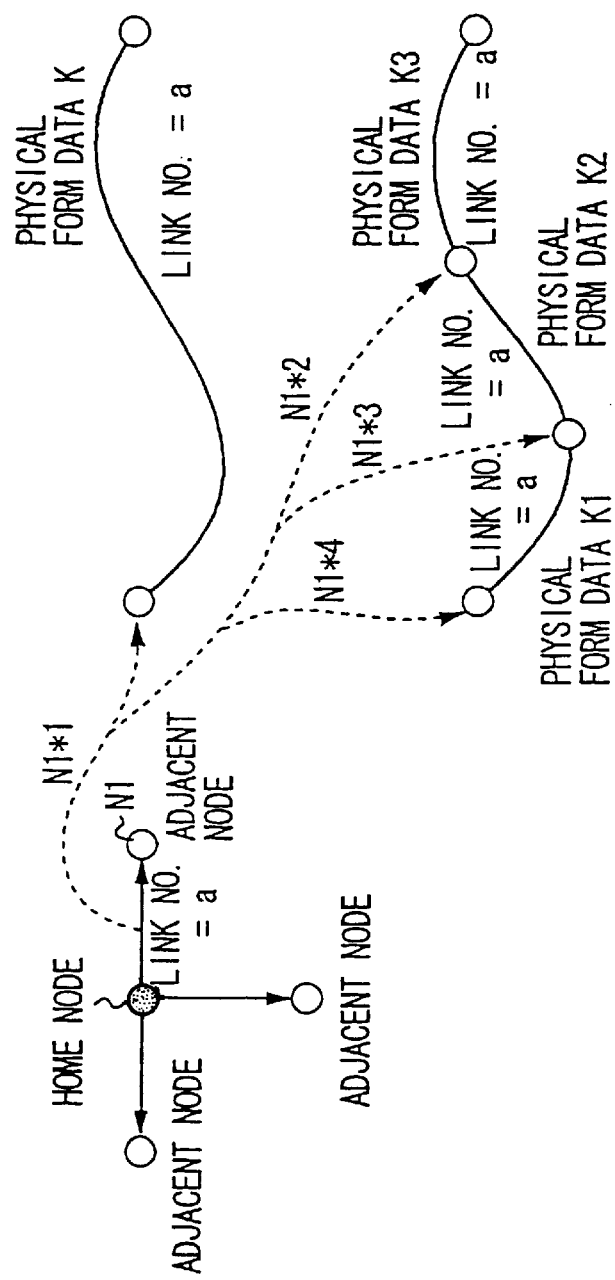
FIG. 21 shows the relationship between the route search data and the route display data in this embodiment.

As shown in FIG. 20, the route search data in this embodiment contain only the connection information of links and do not contain information related to road physical forms. FIG. 21 shows the relationship between the route display data used for displaying a recommended route and the route search data. As shown in FIG. 21, only the minimum information, such as the link no., is stored in a storage area of the route search data for a route which connects between the home node and the adjacent node N1. Road physical form data K corresponding to the link no. are stored in a storage area of the route display data at the same level (the same reduced scale). In addition, in a storage area of the route display data at a lower order level (large reduced scale), road physical form data K1 through K3 corresponding to the link nos. are stored.

Figure 22:
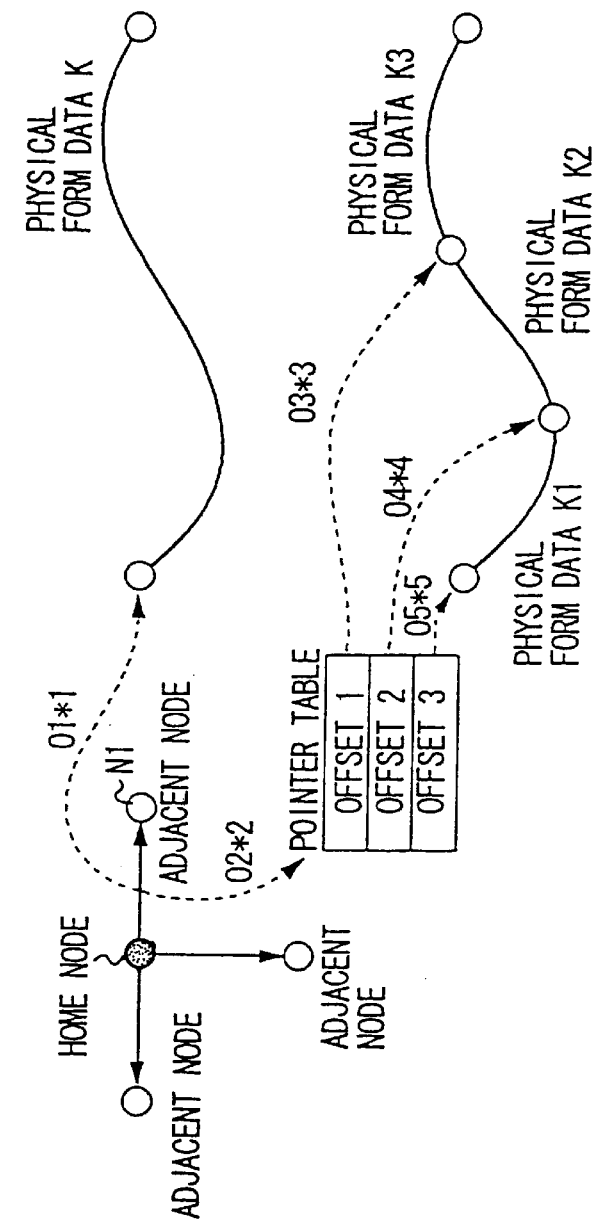
FIG. 22 shows the relationship between the route search data and the route display data in the prior art.
Figure 23:
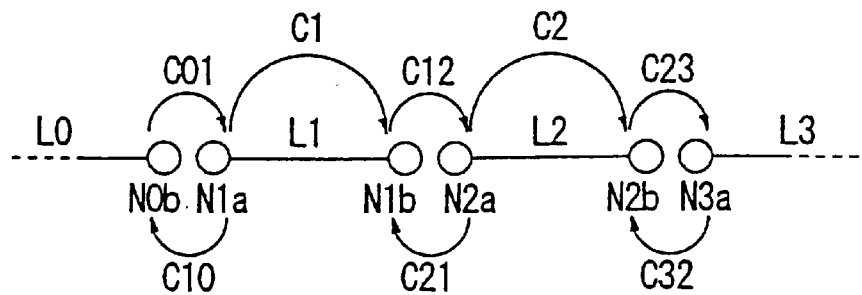
FIG. 23 shows the data management method employed for road map data in an apparatus in the prior art.
Figure 24:
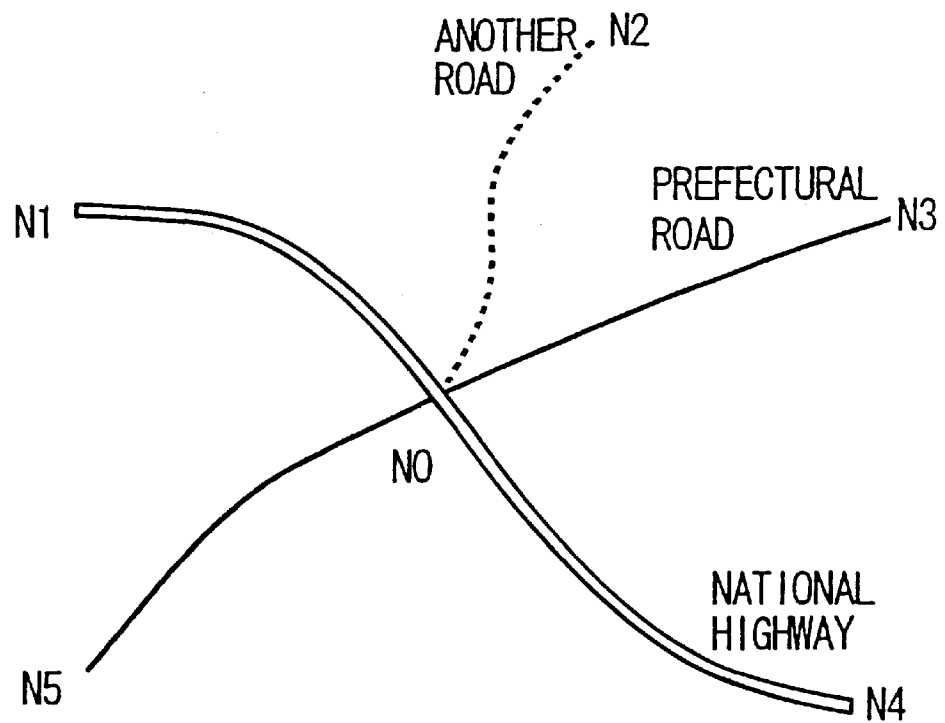
FIG. 24 shows the vicinity of an intersection where a plurality of roads intersect.
Figure 25:
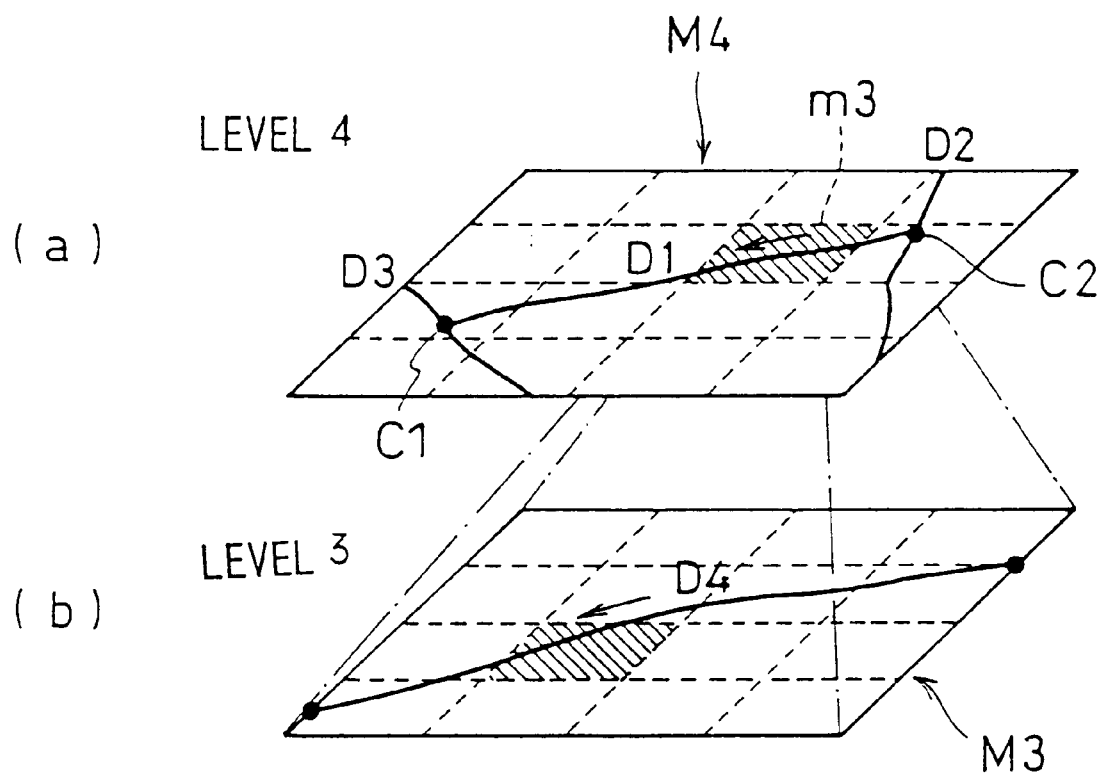
FIGS. 25A and 25B explain the road map of data for road map display between different levels.

In contrast, in route search data in a map database apparatus in the prior art, address offset information for the route display data is held as shown in FIG. 22 instead of the idea of the link no. of the link string data according to the present invention. For instance, for the route connecting between the home node and the adjacent node N1, address offset information 01 for the route display data at the same management level and address offset information 02 for route display data at a lower order level are held. Because of this, a problem arises in that the data volume of the route search data becomes very large.

Since, in this embodiment, road physical forms are detected based upon the link no. in the route search data for the route display data in the manner described above, it is not necessary to include address offset information for the route display data or road data used exclusively for route display in the route search data, and the data volume of the route search data is reduced compared to that of the route search data in the prior art.

What is claimed is:

1. A map database apparatus, in which: a road is represented as a link string in which a plurality of links, each of which has nodes at both ends thereof, are connected; and a plurality of link string data, each of which includes node information relating to said node and is respectively provided for each of plural levels which correspond to different scale maps with regard to an identical link string, are stored, wherein:

a link of a lower level which has a larger scale, said link being common to a link of an upper level which has a smaller scale, has a link identifying data which is different from information that identifies said node, and is common to a link identifying data of said common link of said upper level.

2. A map database apparatus according to claim 1, wherein:

in said link string data, node information relating to a node which connects adjacent links is shared with said adjacent links.

3. A map database apparatus according to claim 1, wherein:

a node of said lower level which has said larger scale, said node being common to a node of said upper level which has said smaller scale, has a node identifying data which is common to a node identifying data of said common node of said upper level.

4. A map database apparatus according to claim 1, wherein:

said node information relating to said node includes a link identifying data of a next link which is to be connected to said node in a connecting order of said plurality of links.

5. A map database apparatus according to claim 1, wherein:

in said link string data said node information relating to said nodes are arranged in connecting order of said links; and said plurality of said link string data which are respectively provided have a common direction of said connecting order of said links with regard to an identical link string.

6. A map database apparatus according to claim 4, wherein:

said node information includes information relating to a node position on a map.

\* \* \* \* \*